US011625469B2

(12) United States Patent
Yadav et al.

(10) Patent No.: US 11,625,469 B2
(45) Date of Patent: Apr. 11, 2023

(54) PREVENTION OF ORGANIZATIONAL DATA LEAKAGE ACROSS PLATFORMS BASED ON DEVICE STATUS

(71) Applicant: MICROSOFT TECHNOLOGY LICENSING, LLC, Redmond, WA (US)

(72) Inventors: Sameer Yadav, Redmond, WA (US); Willard Bruce Jones, Redmond, WA (US); Matthew R. Wallace, Kirkland, WA (US); Kavita K. Kamani, Redmond, WA (US); Titus C. Miron, Bellevue, WA (US); Alexandru Munteanu, Seattle, WA (US); Sarat Subramaniam, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 621 days.

(21) Appl. No.: 15/599,967

(22) Filed: May 19, 2017

(65) Prior Publication Data

US 2018/0336334 A1 Nov. 22, 2018

(51) Int. Cl.
*G06F 21/00* (2013.01)
*G06F 21/33* (2013.01)
(Continued)

(52) U.S. Cl.
CPC ............ *G06F 21/33* (2013.01); *G06F 21/126* (2013.01); *G06F 21/31* (2013.01); *G06F 21/44* (2013.01);
(Continued)

(58) Field of Classification Search
CPC ....... G06F 21/33; G06F 21/126; G06F 21/445
See application file for complete search history.

(56) References Cited

U.S. PATENT DOCUMENTS 10,033,702 B2 * 7/2018 Ford .................... G06F 16/951
10,075,552 B2 * 9/2018 Demsey ............. H04L 67/2842
(Continued)

OTHER PUBLICATIONS

"Conditional cloud access control based on context", https://www.netskope.com/platform/access-control/, Retrieved On: Apr. 11, 2017, 7 pages.
(Continued)

*Primary Examiner* — Philip J Chea
*Assistant Examiner* — Rodman Alexander Mahmoudi
(74) *Attorney, Agent, or Firm* — Newport IP, LLC; Leonard J. Hope

(57) ABSTRACT

Technologies are provided for prevention of organizational data leakage across platforms based on device status. A device management service may include status information for a client device and/or a connection in a token provided to the client device and update the status in response to changes. An applicable data protection policy may be determined based on the detected status and optionally based on data being accessed. An instruction may be transmitted to a client application executed on the client device based on the applicable data protection policy thereby enforcing the data protection policy at the server. The instruction may cause a script executed at the client application to disable one or more user interface controls associated with functionality such as downloading, synchronizing, printing, etc. of the organizational data to prevent leakage of organizational data.

20 Claims, 7 Drawing Sheets

(51) Int. Cl.
    *G06F 21/44* (2013.01)
    *G06F 21/52* (2013.01)
    *G06F 21/12* (2013.01)
    *G06F 21/31* (2013.01)
    *G06F 21/60* (2013.01)
    *G06F 21/62* (2013.01)
    *H04L 9/40* (2022.01)
    *H04L 12/18* (2006.01)

(52) U.S. Cl.
    CPC ............ *G06F 21/445* (2013.01); *G06F 21/52* (2013.01); *G06F 21/606* (2013.01); *G06F 21/62* (2013.01); *G06F 21/6218* (2013.01); *H04L 63/08* (2013.01); *H04L 63/105* (2013.01); *H04L 63/20* (2013.01); *H04L 12/1818* (2013.01)

(56) References Cited

U.S. PATENT DOCUMENTS

| | | | |
|---|---|---|---|
| 2004/0224771 A1 | 11/2004 | Chen et al. | |
| 2006/0218391 A1* | 9/2006 | Glazer | G06F 21/33 713/152 |
| 2006/0238786 A1* | 10/2006 | Sakura | G06F 3/1285 358/1.9 |
| 2009/0183233 A1 | 7/2009 | Trueba et al. | |
| 2009/0254572 A1* | 10/2009 | Redlich | G06Q 10/06 |
| 2013/0074186 A1* | 3/2013 | Muttik | G06F 21/51 726/24 |
| 2014/0259093 A1 | 9/2014 | Narayanaswamy et al. | |
| 2016/0050194 A1* | 2/2016 | Rachmiel | H04L 63/08 726/4 |
| 2016/0191526 A1* | 6/2016 | Panchapakesan | H04L 63/10 726/1 |
| 2016/0344736 A1 | 11/2016 | Khait et al. | |
| 2017/0243028 A1* | 8/2017 | LaFever | G06F 21/6254 |

OTHER PUBLICATIONS

Coles, Cameron, "Chalktalk: Cloud Access Control for Managed / Unmanaged Devices", https://www.skyhighnetworks.com/cloud-security-blog/chalktalk-cloud-access-control-for-managed-unmanaged-devices/, Retrieved On: Apr. 11, 2017, 7 pages.

"Protecting a Network from Unmanaged Clients", https://msdn.microsoft.com/en-us/library/cc875843.aspx, Published On: Aug. 29, 2006, 40 pages.

"Cisco: Meraki", https://meraki.cisco.com/lib/pdf/meraki_datasheet_sm.pdf, Retrieved On: Apr. 11, 2017, pp. 1-10.

* cited by examiner

PREVENTION OF ORGANIZATIONAL DATA LEAKAGE ACROSS PLATFORMS BASED ON DEVICE STATUS

BACKGROUND

Organizations may want to prevent data leakage via devices that are not managed by their information technology departments. However, in the increasingly mobile and cloud-based data access environment, mobile workers and external partners may need access to organizational data on the go and from personal devices that are not necessarily managed by their organizations. Completely blocking access to unmanaged devices or unverified network locations may make it difficult or impossible for external partners or internal users to access corporate resources. Relaxed access policies for unmanaged devices or unverified network locations may make organizations susceptible to leakage if a user downloads content onto an unmanaged device, for example.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to prevention of organizational data leakage across platforms based on device status. In some examples, client device and/or a connection status (e.g., whether the client device is connected through a verified or trusted network) may be detected based on a device management service token associated with the client device. The device management service may include the status information in the token and update it based on changes. Next, an applicable data protection policy may be determined based on the detected status and an instruction transmitted to a client application executed on the client device based on the applicable data protection policy. The instruction may cause the client application (or a script executed at the client application) to disable one or more user interface controls to prevent leakage of organizational data. The user interface controls may provide functionality such as downloading, synchronizing, printing, etc. of the organizational data.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
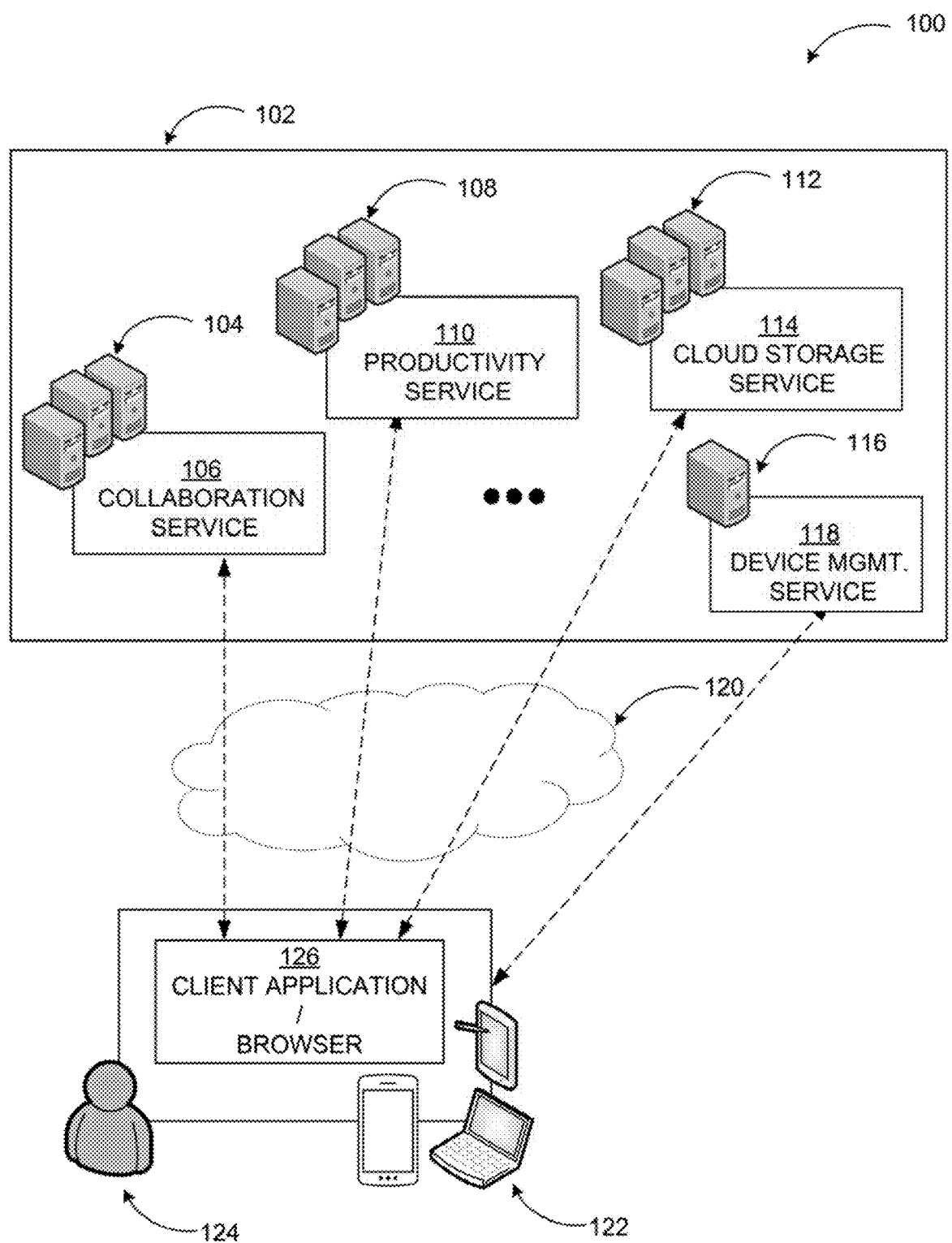
FIG. 1 includes a display diagram illustrating example a network environment where a system to provide prevention of organizational data leakage across platforms based on device status may be implemented.

Briefly described, technologies are provided for prevention of organizational data leakage across platforms based on device status. A device management service may include status information associated with a client device and/or a connection status (e.g., whether the client device is connected through a verified or trusted network) in a token provided to the client device and update the status in response to changes. An applicable data protection policy may be determined based on the detected status and optionally based on data being accessed. An instruction may be transmitted to a client application executed on the client device based on the applicable data protection policy thereby enforcing the data protection policy at the server. The instruction may cause a script executed at the client application to disable one or more user interface controls associated with functionality such as downloading, synchronizing, printing, etc. of the organizational data to prevent leakage of organizational data.

In some examples, the client may make a request that the policy module may determine should be subject to the data-leakage restrictions. The policy module may make that determination available to the server (e.g., document server). If satisfying the client request violates the data-leakage policy, then the document server may refuse the request.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provide prevention of organizational data leakage across platforms based on device status. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example embodiments may be found in the following description.

The technical advantages of prevention of organizational data leakage across platforms based on device status may include, among others, enhanced security, improved performance, reduced processing and network bandwidth usage, and improved user interaction by providing automatic prevention of download, synchronization, printing, and similar functionality that may lead to leakage of organizational data on unmanaged devices or untrusted network locations.

FIG. 1 includes a display diagram illustrating example a network environment where a system to provide prevention of organizational data leakage across platforms based on device status may be implemented.

As illustrated in diagram 100, an example system may include a datacenter 102 (may also be referred to as hosted services platform) hosting a collaboration service 106 executed on servers 104, a productivity service 110 executed on servers 108, and a cloud storage service 114 executed on servers 112. The collaboration service 106 may be configured to provide functionality associated with sharing documents, team collaboration, access to databases, etc. The productivity service 110 may be configured to, among other things, provide productivity services such as word processing, spreadsheets, presentations, calendar applications, etc. The cloud storage service 114 may provide cloud storage services. The datacenter 102 may also host a device management service 118 executed on servers 116. The device management service 118 may provide authentication and authorization services to managed devices, for example. The productivity service 110, the cloud storage service 114, and the collaboration service 106 are examples of hosted services that allow users to access their services through client applications such as client application or browser 126 executed on one or more client devices 122.

Other examples of hosted services may include communication services, scheduling services, online conferencing services, and comparable ones. As described herein, the productivity service 110, the collaboration service 106, the cloud storage service 114, and/or the device management service 118 may be implemented as software, hardware, or combinations thereof.

In some embodiments, the productivity service 110, the collaboration service 106, and the cloud storage service 114 may be configured to interoperate with the client application or browser 126 through the client devices 122 over one or more networks, such as network 120. For example, the client application may be a locally installed ("thick") application on a managed device or a browser on an unmanaged device. The client devices 122 may include a desktop computer, a laptop computer, a tablet computer, a vehicle-mount computer, a smart phone, or a wearable computing device, among other similar devices. Other configurations with additional or fewer components and hierarchies may also be implemented.

In some examples, the device management service 118 may include a status of the client device (e.g., managed or unmanaged, connected through a trusted network or untrusted network) in a token and update it based on changes. Next, an applicable data protection policy may be determined based on the detected status and an instruction transmitted to the client application 126 executed on the client device based on the applicable data protection policy. The instruction may cause the client application (or a script executed at the client application) to disable one or more user interface controls to prevent leakage of organizational data.

Figure 2:
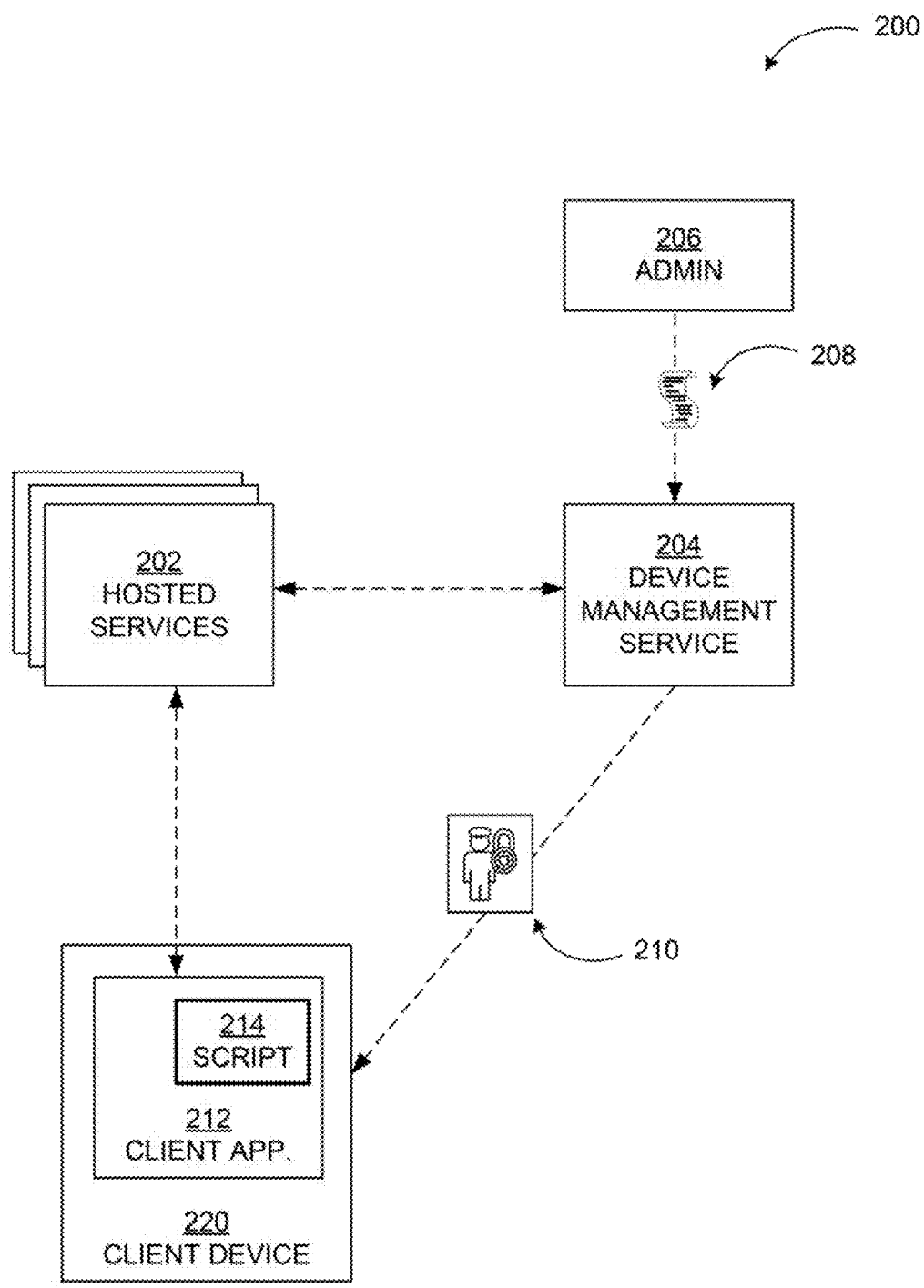
FIG. 2 is a conceptual diagram illustrating use of a token and a client-side script in prevention of organizational data leakage across platforms based on device status.

FIG. 2 is a conceptual diagram illustrating use of a token and a client-side script in prevention of organizational data leakage across platforms based on device status.

As shown in diagram 200, an administrator may define or customize a data protection policy 208 through an administration user interface 206 of a device management service 204. The device management service 204, in conjunction with one or more hosted services 202, may provide a token 210 to a client device 220. The token 210 may include information associated with a status of the client device 220 such as whether the device is managed or unmanaged, connected to the hosted services 202 through a trusted or untrusted network, etc. Based on the device status (from the token) and the data protection policy, a script 214 executed as part of a client application 212 on the client device may be provided an instruction to disable data access controls such as download, synchronize, and similar ones to prevent leakage of organizational data if the device is unmanaged or connected through an untrusted network.

The data protection policy 208 may be a conditional access policy based on client device status. For example, the policy may include application enforced restrictions, where the applications may be defined by the administrator (e.g., collaboration, productivity, cloud storage, etc.). Thus, the restrictions may be implemented across multiple applications or services. Furthermore, implementation of the policy may also be more granular than just the application types as discussed below in conjunction with FIG. 3. In some embodiments, the application or hosted service (or an authentication module or application within the hosted service) may receive device claims from the device management service 204 and determine if the user is to be given full access to data or restricted access. For example, download, print, synchronize type controls which may allow organizational data to be leaked (that is, stored in an unsafe device or sent over unsafe network), may be disabled. The hosted service may disable the applicable controls by instructing the client application 212 and informing it that those functionalities are not available. To avoid an error message to be displayed to the user, the script 214 at the client application 212 may hide the affected controls, for example. In other examples, a warning banner may be displayed to the user letting them know they are being given a restricted experience due to the data protection policy.

Figure 3:
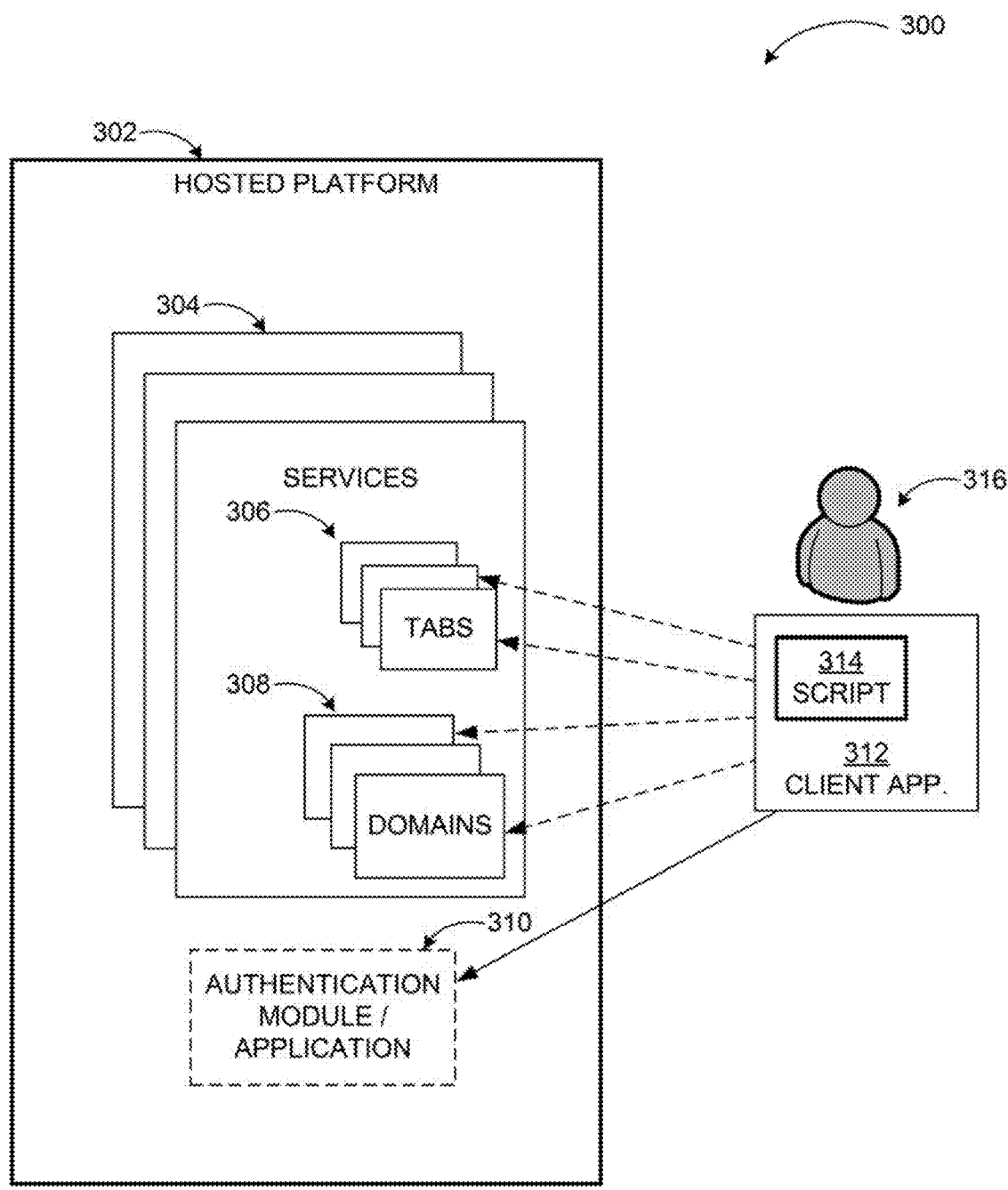
FIG. 3 is another conceptual diagram illustrating prevention of organizational data leakage across platforms based on device status.

FIG. 3 is another conceptual diagram illustrating prevention of organizational data leakage across platforms based on device status.

As discussed above, a conditional access policy may be configured to give users a limited access to organizational data when on unmanaged devices (non-domain joined or non-compliant) or connected through an untrusted network. User interface controls that may result in data being downloaded from the cloud onto an unmanaged device may then be removed or disabled. If a user is accessing resources from an unmanaged device, they may be presented with a warning banner letting them know they are being given a restricted experience due to data protection policy. Users may be able to view content but not download. In some scenarios, users may be allowed to edit the content/data, but only at the cloud, not through the local storage.

Diagram 300 shows a hosted service platform 302 hosting multiple services 304 such as a productivity service, a collaboration service, a cloud storage service, a communication service, etc. Some of the services 304 may include (as part of their functionality) different tabs 306 or domains 308. For example, a collaboration service may include different teams tabs or domains and sub-domains for the different groups of users, an authentication module or application 310 within the hosted service platform 302 (or in individual services 304) working in conjunction with a script 314 at a client application 312 may implement a conditional data access restriction for user 316 when the user is accessing the services 304 through an unmanaged device.

Thus, a system according to embodiments may distinguish device states (managed vs. unmanaged), and restrict organizational data access through disabling or hiding user interface controls that may result in operations saving cloud data to local storage. Restrictions may be applied across applications or services, tabs or domains, or even based on data type. In some examples, organizational data may be categorized (for example, sensitive data, non-sensitive data, etc.) and access restrictions applied based on the data type as well.

Figure 4:
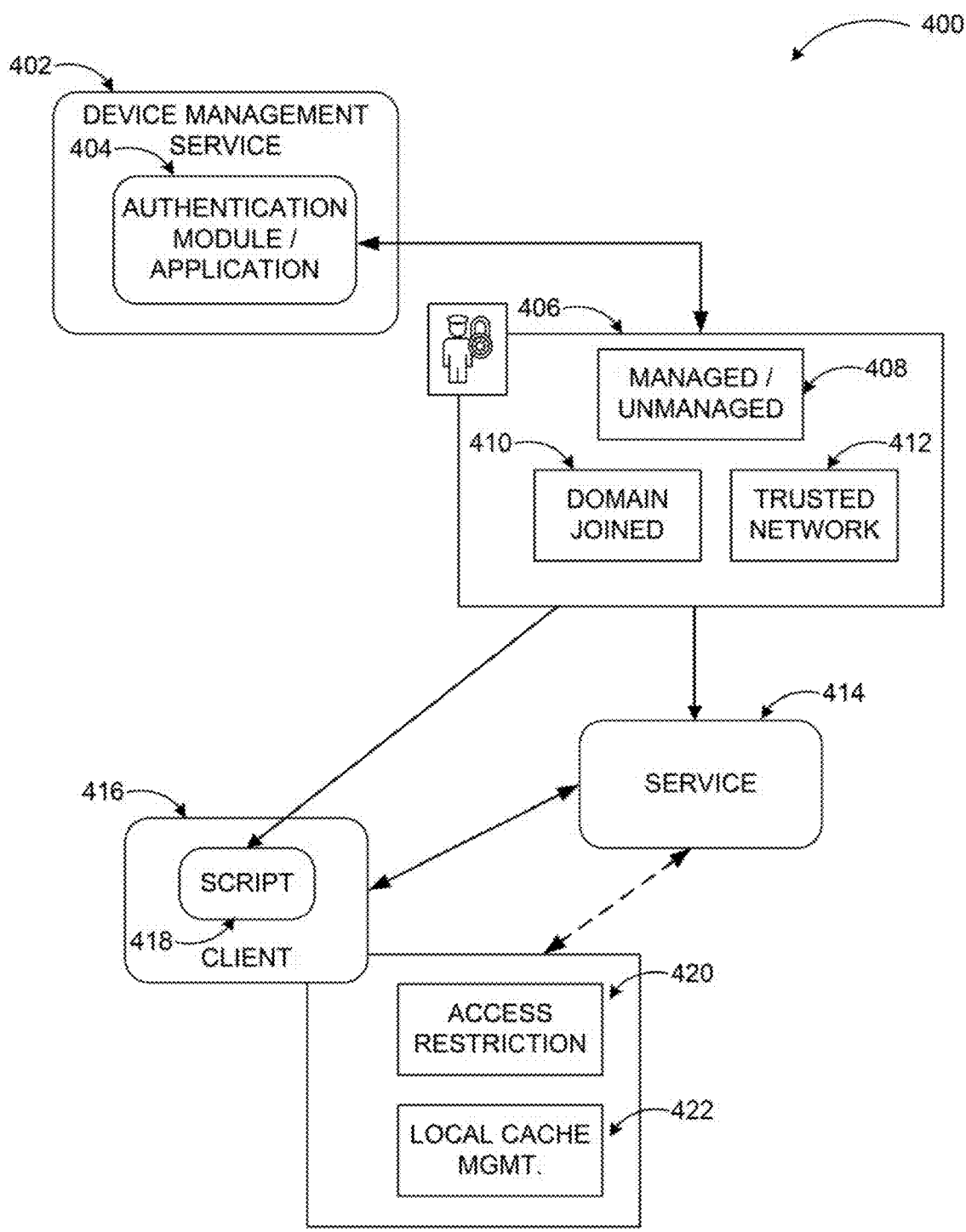
FIG. 4 is a display diagram illustrating flow of actions among components of a system for prevention of organizational data leakage across platforms based on device status.

FIG. 4 is a display diagram illustrating flow of actions among components of a system for prevention of organizational data leakage across platforms based on device status.

In an example implementation shown in diagram 400, device state information in a token 406 issued by device management service 402 or an authentication module or application 404 within the device management service 402 (for example, an open id connect "OIDC" token) may be checked at authentication time. The service 414 may rely on the token 406 to determine the current device state (e.g., managed/unmanaged 408, domain joined 410, connected through a trusted network 412, etc.)) for the request. Policy behavior may be determined based on the device state and policy configuration. Policy behavior may then be communicated to the client 418 and the service 414 for enforcement. In some examples, an agent at the client may report device/network status to the device management service 402, which may then insert the status into the token 406.

Upon receiving the policy behavior information, the service 414 may restrict functionality that may allow data to be stored locally at the client device. The client 416 may disable user interface controls associated with such functionality through the script 418 such that the user is not given error messages when they attempt to use the controls. Additional restrictions may be applied by the client 416 and the service 414 may further intervene if the client 416 does not hide necessary controls in other examples.

In further embodiments, the restriction policy may be applied to local cache management 422 in addition to implementing the access restriction 420. In some scenarios, just the act of viewing cloud-stored content may leave data temporarily saved in local cache vulnerable to leakage. Thus, the data protection policy may dictate timing restriction on cached data and/or destruction of locally cached data upon expiration of a time period or completion of viewing, etc.

Figure 5:
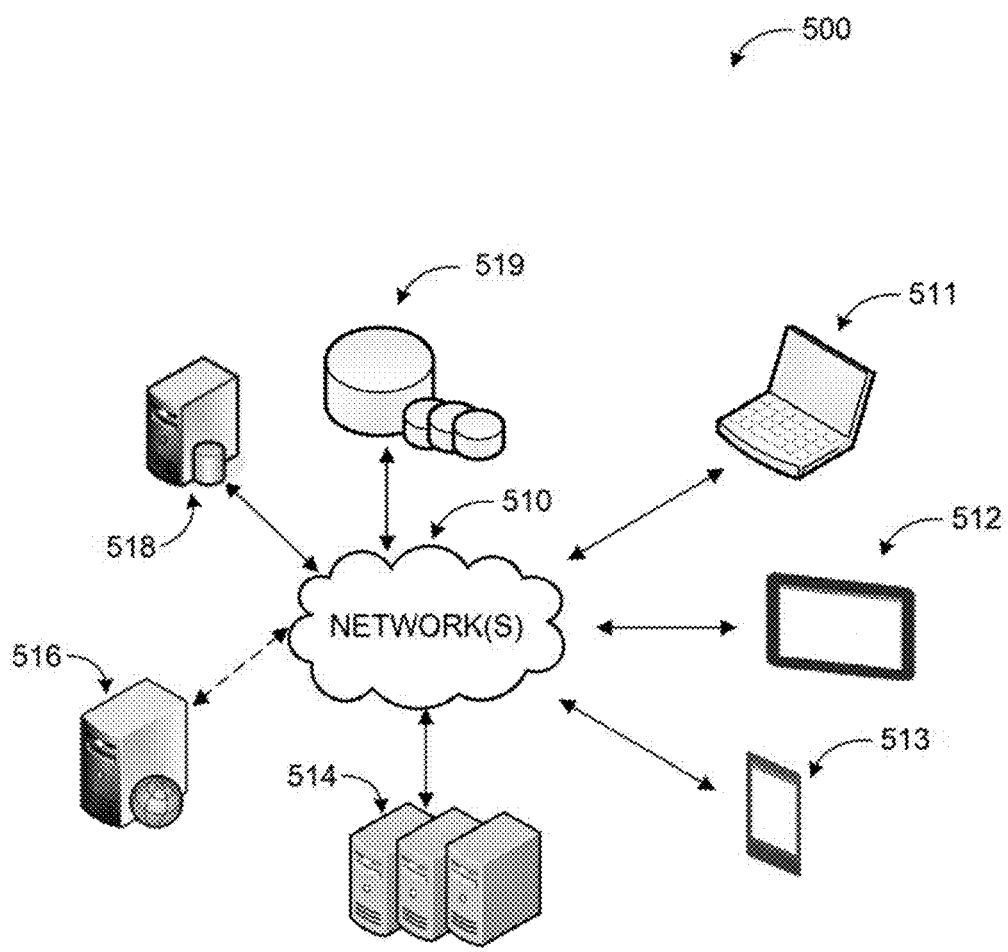
FIG. 5 is an example networked environment, arranged in accordance with at least some embodiments described herein.

FIG. 5 is an example networked environment, arranged in accordance with at least some embodiments described herein.

As shown in a diagram 500, a cloud based platform providing prevention of organizational data leakage across platforms based on device status may be implemented in a networked environment over one or more networks such as network 510. An example cloud based platform may provide multiple services such as a storage service, a collaboration service, a productivity services, and similar ones. Users may access the cloud based platform and its services through locally installed or thin (e.g., browser) client applications executed on a variety of computing devices. Functionality associated with prevention of organizational data leakage within the cloud based platform environment may be provided by an authentication module or application executed within the cloud based service executed on servers 514 or processing server 516.

A cloud based platform, as discussed herein, may be implemented via software executed over servers 514. The servers 514, may include one or more processing server 516, where at least one of the one or more processing servers 516 may be configured to execute one or more applications associated with the cloud based platform. The cloud based platform may store data associated with user action(s), user(s), and/or content in a data store 519 directly or through a database server 518.

The network 510 may comprise any topology of servers, clients, Internet service providers, and communication media. A system according to embodiments may have a static or dynamic topology. The network 510 may include multiple secure networks, such as an enterprise network, an unsecure network, or the Internet. The unsecure network may include a wireless open network. The network 510 may also coordinate communication over other networks, such as Public Switched Telephone Network (PSTN) or cellular networks. Furthermore, the network 510 may include multiple short-range wireless networks, such as Bluetooth, or similar ones. The network 510 may provide communication between the nodes described herein. By way of example, and not limitation, the network 510 may include wireless media. The wireless media may include, among others, acoustic media, RF media, infrared media, and other wireless media.

A textual scheme, a graphical scheme, an audio scheme, an animation scheme, a coloring scheme, a highlighting scheme, and/or a shading scheme may be employed to further enhance user interaction with a client interface of the cloud based platform that provides prevention of organizational data leakage across platforms based on device status.

Many other configurations of the computing devices, the applications, the data sources, and the data distribution systems may be employed to provide prevention of organizational data leakage across platforms based on device status. Furthermore, the networked environments discussed in FIG. 5 are for illustration purposes only. Embodiments are not limited to the example applications, modules, or processes.

Figure 6:
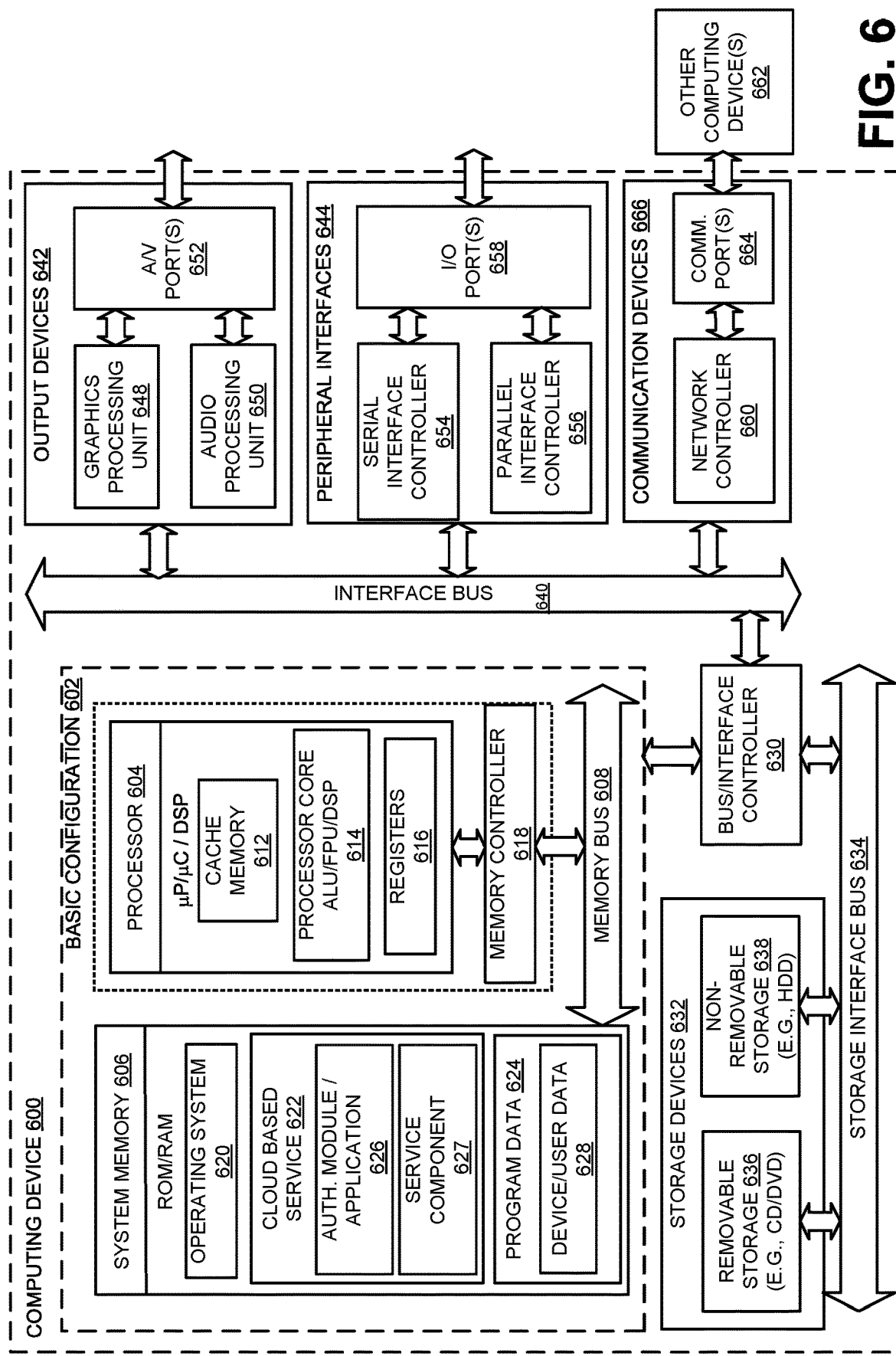
FIG. 6 illustrates a computing device, which may be configured to provide prevention of organizational data leakage across platforms based on device status, arranged in accordance with at least some embodiments described herein.

FIG. 6 illustrates a computing device, which may be configured to provide prevention of organizational data leakage across platforms based on device status, arranged in accordance with at least some embodiments described herein.

For example, a computing device 600 may be a server used to provide authentication and protection within a hosted service such as a cloud based service 622, as discussed herein. In an example of a basic configuration 602, the computing device 600 may include a processor 604 and a system memory 606. The processor 604 may include multiple processors. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (μP), a microcontroller (μC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, the cloud based service 622, and program data 624. The cloud based service 622 may include an authentication module or application 626 and one or more service components 627. The service component(s) 627 may provide access to organizational data through collaboration, cloud storage, productivity, and similar interfaces. The authentication module or application 626 together with the service component(s) 627 may provide prevention of organizational data leakage across platforms based on device status by detecting client device or network connection status based on a token and instructing the client application to hide/disable functionality that may lead to leakage of organizational data. Program data 624 may include, among others, device or user data 628.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and data storage devices 632 via a storage interface bus 634. The data storage devices 632 may be removable storage devices 636, non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. The one or more output devices 642 may include a graphics processing unit 648 and an audio processing unit 650, which may be configured to communicate to various external devices, such as a display or speakers via one or more A/V ports 652. The one or more peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. The one or more communication devices 666 may include a network controller 660, which may be arranged to facilitate communications with one or more other computing devices 662 over a network communication link via one or more communication ports 664. The one or more other computing devices 266 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a specialized server, mainframe, or similar computer, which includes any of the above functions. The computing device 600 may also be implemented as a personal computer including both laptop computer and non-laptop computer configurations.

Example embodiments may also include methods to provide prevention of organizational data leakage across platforms based on device status. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
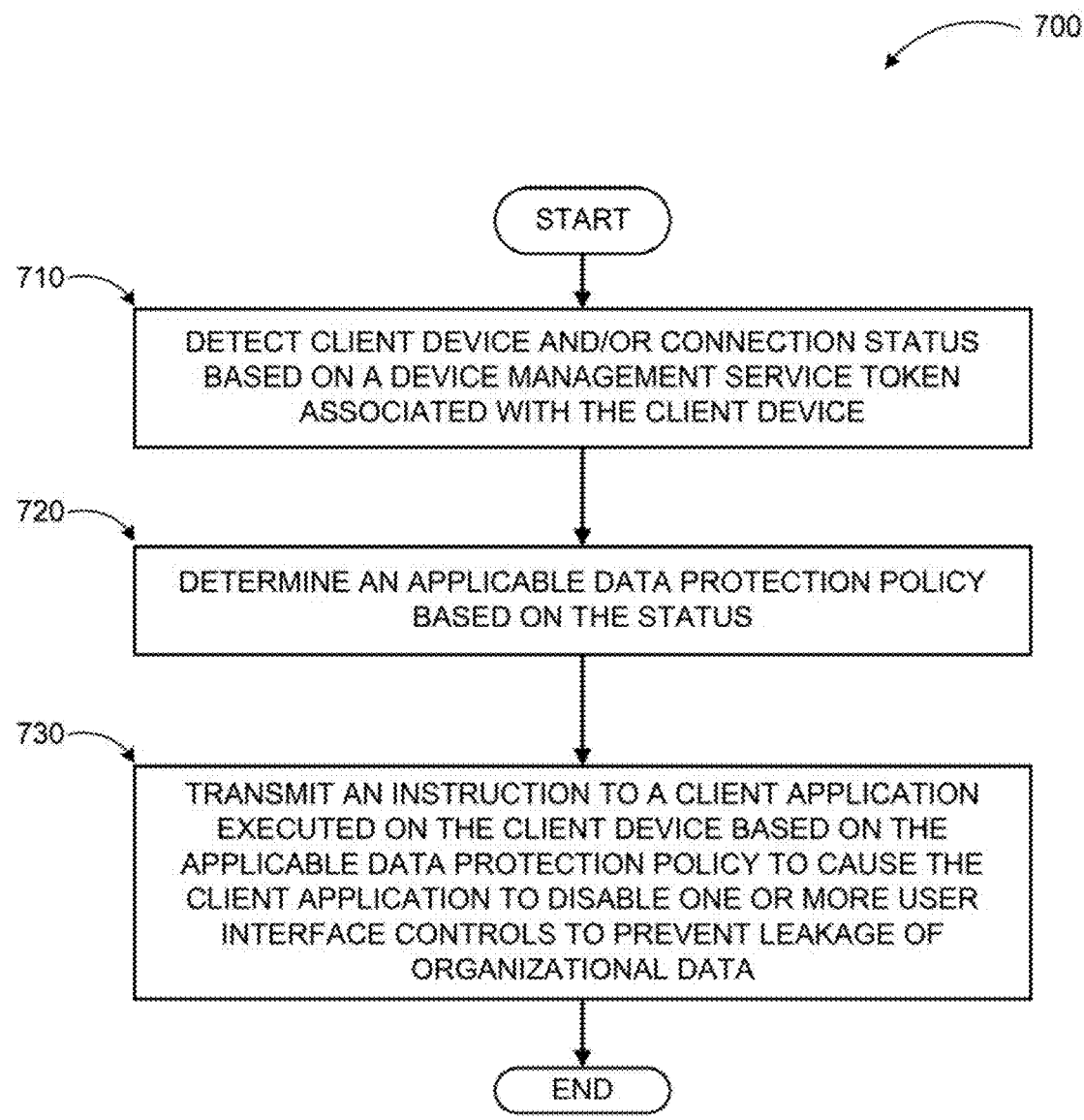
FIG. 7 illustrates a logic flow diagram for an example process of prevention of organizational data leakage across platforms based on device status, arranged in accordance with at least some embodiments described herein.

FIG. 7 illustrates a logic flow diagram for an example process of prevention of organizational data leakage across platforms based on device status, arranged in accordance with at least some embodiments described herein.

A process 700 may be implemented by a cloud based service and/or its components, for example by an authentication module and a service component of the cloud based service, where the components may be executed on one or more servers or other computing devices.

Process 700 may begin with operation 710, where a client device and/or connection status may be detected based on a device management service token associated with the client device. At operation 720, an applicable data protection policy may be determined based on the client device/connection status and/or type of data being requested for access. At operation 730, an instruction may be transmitted to a client application executed on the client device based on the applicable data protection policy to cause the client application to disable one or more user interface controls to prevent leakage of organizational data.

The operations included in process 700 are for illustration purposes. A cloud based platform to provide prevention of organizational data leakage across platforms based on device status, according to embodiments, may be implemented by similar processes with fewer or additional steps, as well as in different order of operations using the principles described herein.

According to examples, a means for providing prevention of organizational data leakage across platforms based on device status is described. The means may include a means for detecting a client device type or a connection status based on a device management service token associated with the client device; a means for determining an applicable data protection policy based on the client device type or the connection status; and a means for transmitting an instruction to a client application executed on the client device based on the applicable data protection policy to cause the client application to disable one or more user interface controls to prevent leakage of the organizational data.

According to some examples, a method to provide prevention of organizational data leakage across platforms based on device status is described. The method may include detecting a client device type or a connection status based on a device management service token associated with the client device; determining an applicable data protection policy based on the client device type or the connection status; and transmitting an instruction to a client application executed on the client device based on the applicable data protection policy to cause the client application to disable one or more user interface controls to prevent leakage of the organizational data.

According to other examples, transmitting the instruction to the client application may include transmitting the instruction to a script executed at the client application, where the script is configured to disable the one or more user interface controls. The one or more user interface controls may include a download control, a share control, a synchronize control, and a print control. The data protection policy may be a service enforced restriction policy. The method may also include receiving a device claim through the token at a hosted service from the device management service; and determining by the hosted service if the client device is to be given full access or restricted access to the organizational data. The instruction may be transmitted by the hosted service.

According to further examples, the hosted service may be a collaboration service, a cloud storage service, a productivity service, or a communication service. The method may include disabling one or more functionalities associated with the one or more user interface controls at the hosted service. The method may also include determining if the one or more user interface controls are disabled at the client device; and if the one or more user interface controls are not disabled at the client device, implementing one or more additional restrictions at the hosted service. The method may further include providing a warning banner to be displayed to a user indicating that the user is being given a restricted experience due to the data protection policy. The method may also include allowing an administrator to configure one or more conditions and restrictions in the data protection policy through the device management service.

According to other examples, a server configured to provide prevention of organizational data leakage across platforms based on device status is described. The server may include a communication interface configured to facilitate communication between a client device and the server, a memory configured to store instructions; and one or more processors coupled to the memory, where the one or more processors, in conjunction with the instructions stored in the memory, execute a hosted service. The hosted service may include a hosted application to provide a cloud-based service to the client device; and an authentication module to receive a claim associated with the client device through a token from a device management service; detect a type of the client device as one of managed and unmanaged or a connection status as one of trusted and untrusted based on the received claim; determine one or more application enforced restrictions in an applicable data protection policy based on the type of the client device or the connection status; and transmit an instruction to a client application executed on the client device to cause the client application to disable one or more user interface controls to implement the one or more application enforced restrictions.

According to some examples, the authentication module may be configured to apply the one or more application enforced restrictions across one or more hosted applications, tabs, and domains associated with the hosted service. The authentication module may also be configured to receive the claim from the device management service at authentication time for a user associated with the client device. The authentication module may be further configured to determine the one or more application enforced restrictions based on a data type. The data type may be determined based on a predefined categorization of the organizational data.

According to further examples, a system configured to provide prevention of organizational data leakage across platforms based on device status is described. The system may include a first server executing a device management service configured to authenticate users of a hosted service; and a second server executing a hosted application configured to provide a cloud-based service to the users of the hosted service. The second server may include a communication interface configured to facilitate communication between a client device and the server; a memory configured to store instructions; and one or more processors coupled to the memory, where the one or more processors, in conjunction with the instructions stored in the memory, execute the hosted application and an authentication module of the hosted application. The authentication module may be configured to receive a claim associated with the client device through a token from the device management service; and detect a type of the client device as one of managed and unmanaged or a connection status as one of trusted and untrusted based on the received claim; determine one or more application enforced restrictions in an applicable data protection policy based on the type of the client device or the connection status; and transmit an instruction to a client application executed on the client device to cause the client application to disable one or more user interface controls to implement the one or more application enforced restrictions, where the one or more user controls activate one or more of downloading, sharing, printing, and synchronizing of the organizational data.

According to yet other examples, the device management service may be configured to receive one or more of client device and network status information from an agent executed on the client device and insert the claim into the token based on the received one or more of client device and network status information. The claim may identify the client device as managed, unmanaged, domain joined, connected to a trusted network, or connected to an untrusted network. The one or more application enforced restrictions may include one or more of a timing restriction and a destruction requirement on locally cached data.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users activating client applications for hosted services.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide prevention of organizational data leakage across platforms based on device status, the method comprising:
   detecting, with a processor, a client device type or a connection status based on a device management service token associated with the client device;
   determining, with the processor, an applicable data protection policy based on the client device type or the connection status; and
   transmitting, with the processor, an instruction to a client application executed on the client device based on the applicable data protection policy to cause the client application to disable one or more user interface controls to prevent leakage of the organizational data;
   determining if the one or more user interface controls are disabled at the client device; and
   in response to determining that the one or more user interface controls are not disabled at the client device, implementing one or more additional restrictions at the hosted service associated with the client device.

2. The method of claim 1, wherein transmitting the instruction to the client application comprises:
   transmitting the instruction to a script executed at the client application, wherein the script is configured to disable the one or more user interface controls.

3. The method of claim 1, wherein the one or more user interface controls include a download control, a share control, a synchronize control, and a print control.

4. The method of claim 1, wherein the data protection policy is a service enforced restriction policy.

5. The method of claim 4, further comprising:
   receiving a device claim through the token at a hosted service from the device management service; and
   determining by the hosted service if the client device is to be given full access or restricted access to the organizational data.

6. The method of claim 5, wherein the instruction is transmitted by the hosted service.

7. The method of claim 5, wherein the hosted service is one of a collaboration service, a cloud storage service, a productivity service, and a communication service.

8. The method of claim 5, further comprising:
   disabling one or more functionalities associated with the one or more user interface controls at the hosted service.

9. The method of claim 1, further comprising:
   providing a warning banner to be displayed to a user indicating that the user is being given a restricted experience due to the data protection policy.

10. The method of claim 1, further comprising:
    allowing an administrator to configure one or more conditions and restrictions in the data protection policy through the device management service.

11. A computing device, comprising:
    a processor; and
    a memory having computer-readable instructions stored thereupon which, when executed by the processor, cause the computing device to:
       detect, with the processor, a client device type or a connection status based on a device management service token associated with the client device;
       determine, with the processor, an applicable data protection policy based on the client device type or the connection status; and
       transmit, with the processor, an instruction to a client application executed on the client device based on the applicable data protection policy to cause the client application to disable one or more user interface controls to prevent leakage of the organizational data;
       determine if the one or more user interface controls are disabled at the client device; and
       in response to determining that the one or more user interface controls are not disabled at the client device, implement one or more additional restrictions at the hosted service associated with the client device.

12. The computing device of claim 11, wherein transmit the instruction to the client application comprises:
    transmitting the instruction to a script executed at the client application, wherein the script is configured to disable the one or more user interface controls.

13. The computing device of claim 11, wherein the one or more user interface controls include a download control, a share control, a synchronize control, and a print control.

14. The computing device of claim 11, wherein the data protection policy is a service enforced restriction policy.

15. The computing device of claim 11, wherein the memory has further computer-readable instructions stored thereupon which, when executed by the processor, cause the computing device to:
    provide a warning banner to be displayed to a user indicating that the user is being given a restricted experience due to the data protection policy.

16. A data storage device having computer-readable instructions stored thereupon which, when executed by a processor of a computing device, cause the computing device to:
    detect, with the processor, a client device type or a connection status based on a device management service token associated with the client device;
    determine, with the processor, an applicable data protection policy based on the client device type or the connection status; and
    transmit, with the processor, an instruction to a client application executed on the client device based on the applicable data protection policy to cause the client application to disable one or more user interface controls to prevent leakage of the organizational data;
    determine if the one or more user interface controls are disabled at the client device; and
    in response to determining that the one or more user interface controls are not disabled at the client device, implement one or more additional restrictions at the hosted service associated with the client device.

17. The data storage device of claim 16, wherein transmit the instruction to the client application comprises:
    transmitting the instruction to a script executed at the client application, wherein the script is configured to disable the one or more user interface controls.

18. The data storage device of claim 16, wherein the one or more user interface controls include a download control, a share control, a synchronize control, and a print control.

19. The data storage device of claim 16, wherein the data storage device has further computer-readable instructions stored thereupon which, when executed by the processor, cause the computing device to:
    provide a warning banner to be displayed to a user indicating that the user is being given a restricted experience due to the data protection policy.

20. The data storage device of claim 16, wherein the data storage device has further computer-readable instructions stored thereupon which, when executed by the processor, cause the computing device to:
    allow an administrator to configure one or more conditions and restrictions in the data protection policy through the device management service.

* * * * *